United States Patent
Valenziano

(10) Patent No.: US 6,989,488 B2
(45) Date of Patent: Jan. 24, 2006

(54) FIRE RETARDANT POKE-THROUGH FITTING

(75) Inventor: Philip F. Valenziano, Colts Neck, NJ (US)

(73) Assignee: Alva-Tech Inc., Asbury Park, NJ (US)

( * ) Notice: Subject to any disclaimer, the term of this patent is extended or adjusted under 35 U.S.C. 154(b) by 147 days.

(21) Appl. No.: 10/648,877

(22) Filed: Aug. 27, 2003

(65) Prior Publication Data

US 2005/0045356 A1    Mar. 3, 2005

(51) Int. Cl.
*H02G 13/00*    (2006.01)

(52) U.S. Cl. .......................... 174/48; 174/50; 174/53; 174/58; 174/67; 52/220.8; 439/650; 220/3.8; 220/3.7

(58) Field of Classification Search .................. 174/48, 174/50, 53, 58, 67; 52/220.8; 439/650; 220/3.8, 3.7, 3.3
See application file for complete search history.

(56) References Cited

U.S. PATENT DOCUMENTS

| | | | |
|---|---|---|---|
| 4,091,231 A | 5/1978 | Sotolongo | |
| 4,243,835 A | 1/1981 | Ehrenfels | |
| 4,264,779 A | 4/1981 | Rhodes et al. | |
| 4,323,724 A | 4/1982 | Shine | |
| 4,336,416 A | 6/1982 | Goodsell | |
| 4,458,460 A * | 7/1984 | Kohaut | 174/48 |
| 4,477,694 A | 10/1984 | Kohaut | |
| 4,496,790 A | 1/1985 | Spencer | |
| 4,572,923 A | 2/1986 | Castellani et al. | |
| 4,573,297 A | 3/1986 | Benscoter et al. | |
| RE32,678 E | 5/1988 | Benscoter et al. | |
| 4,770,643 A | 9/1988 | Castellani et al. | |
| 5,003,127 A | 3/1991 | Sosinski et al. | |
| 5,032,690 A | 7/1991 | Bloom | |
| 5,393,930 A | 2/1995 | Wuertz | |
| 5,410,103 A | 4/1995 | Wuertz | |
| 5,466,886 A * | 11/1995 | Lengyel et al. | 174/48 |
| 5,641,940 A | 6/1997 | Whitehead | |
| 5,696,349 A | 12/1997 | Bera | |
| 5,763,826 A | 6/1998 | Castellani et al. | |
| 5,814,764 A | 9/1998 | Hohaut | |
| 6,018,126 A | 1/2000 | Castellani et al. | |
| 6,114,623 A | 9/2000 | Bonilla et al. | |
| 6,307,152 B1 | 10/2001 | Bonilla et al. | |

* cited by examiner

*Primary Examiner*—Dean A. Reichard
*Assistant Examiner*—Anton Harris
(74) *Attorney, Agent, or Firm*—Hedman & Costigan, P.C.

(57) ABSTRACT

A poke through fitting comprising a conduit body, the conduit body including a conduit, a fixed flange and a slidable flange, and an intumescent member formed at least in part of an intumescent material, said intumescent member comprising a retention member for retaining the intumescent member on the conduit body wherein an engagement member maintains a relationship between the slidable flange of the conduit body and the intumescent member during expansion of the intumescent material. A stop member is preferably provided in a fixed relationship to the conduit to limit the travel of the slidable flange during expansion of the intumescent material.

17 Claims, 5 Drawing Sheets

FIRE RETARDANT POKE-THROUGH FITTING

FIELD OF THE INVENTION

The present invention relates generally to the field of poke-through fittings or devices for in-floor or in-wall fire retardant applications providing electrical, communications and related wiring connections.

BACKGROUND OF THE INVENTION

The prior art shows a number of fire retardant devices or fittings for the installation of electrical, communications and related wiring connections through a fire retardant floor. These fittings are designed to maintain the fire rated capabilities of the floor, so that the fire rating is substantially the same as if the hole and fitting did not pass through the floor. Examples of such fittings are described, inter alia, in U.S. Pat. Nos. 5,393,930; 5,696,349; 5,763,826; and 5,814,764.

These and other prior art references utilize a conduit for carrying the wiring through the fire rated floor, said conduit generally attaching to a floor mounted box at or above the top surface of the floor and a junction box located below the floor. The conduit is generally surrounded by elements sized to fit substantially within a through hole in the floor, the standard poke through holes having a 3 inch or a 4 inch diameter. To maintain a fire rating, it is known in the prior art to use fire barriers in the portion of the through holes surrounding the conduit.

It has been shown that the most preferred fire barriers currently used in poke through fittings have been intumescent materials that swell or expand during high temperature conditions. In the event of fire the high temperatures cause the intumescent materials to expand to fill any openings in the floor, thereby inhibiting the spread of smoke and fire to adjacent floors.

However, current fire retardant poke-through fittings are generally multi-component devices which require complex manufacture, are inefficient for use across a variety of conditions commonly found in the field and are challenging to properly install. For instance, the lower intumescent portion of the device of U.S. Pat. No. 5,814,764, as best seen in FIG. 4 of that patent, would be wasted when used with a thinner floor. In another example, the device of U.S. Pat. No. 5,393,930 requires that the lower intumescent portion be manually positioned at the lower edge of the floor and securely tightened using set screws.

It is therefore an object of the present invention to provide a fire retardant poke-through device that efficiently uses intumescent materials and reduces the human error involved in the proper location of the lower intumescent material. It is a further object of the present invention to provide such a poke-through fitting which is easily manufactured with a limited number of parts.

SUMMARY OF THE INVENTION

This and other objects are achieved by the present invention which is directed to a fire retardant poke through fitting comprising a conduit body, said conduit body including a conduit, a fixed flange and a slidable flange, and an intumescent member formed at least in part of an intumescent material, said intumescent member comprising a retention member for retaining the intumescent member on the conduit body wherein an engagement member maintains a relationship between the slidable flange of the conduit body and the intumescent member during intumescent expansion.

The present device also preferably includes a stop member fixed on the conduit body at a position corresponding with the thickest standard wall or floor, generally a 4 hour fire rated floor, to limit the maximum travel of the slidable flange during expansion of the intumescent member when a sufficient heat condition has been achieved.

It is preferred that the fixed flange be located at or substantially near the upper terminal end of the conduit body for cooperating with a retention member of the intumescent material. In the preferred embodiment, the intumescent member is formed of two or more portions which are brought together about the fixed flange of the conduit. The preferred intumescent member utilizes a slot within the interior as a retention member for receiving the fixed flange, to retain the intumescent member on the conduit body.

The slidable flange is maintained in relation to the intumescent member slidable flange during expansion of the intumescent material. This is preferably, but not necessarily, accomplished through the use of cooperating members on the intumescent member and the slidable flange. Once the intumescent member is retained on the conduit body and maintained in relation to the slidable flange, no field adaptation is necessary during installation regardless of the floor or wall fire rating.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
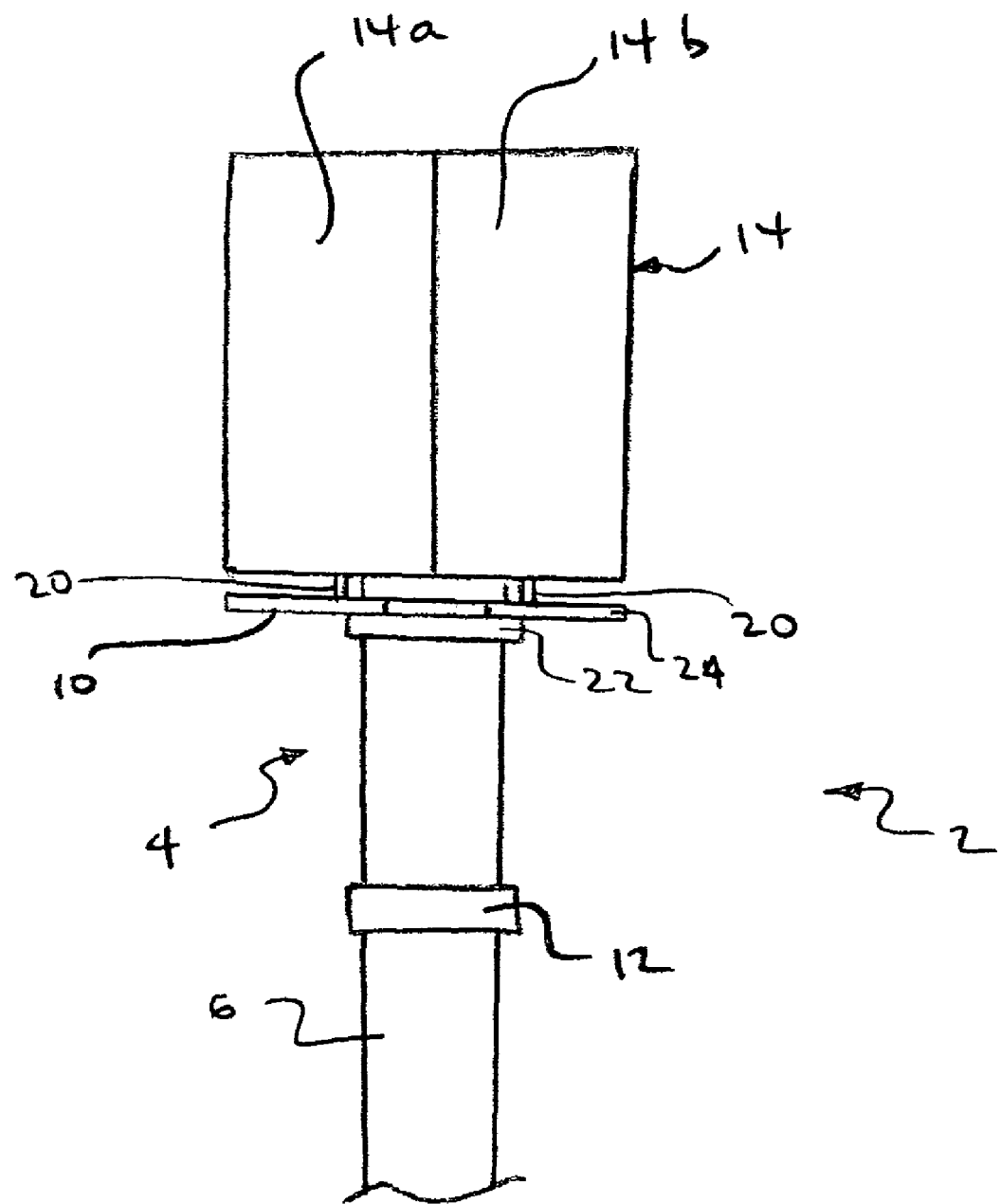
FIG. 1 is a side elevation of an intermediate portion of a poke-through fitting formed in accordance with the present invention.
Figure 2:
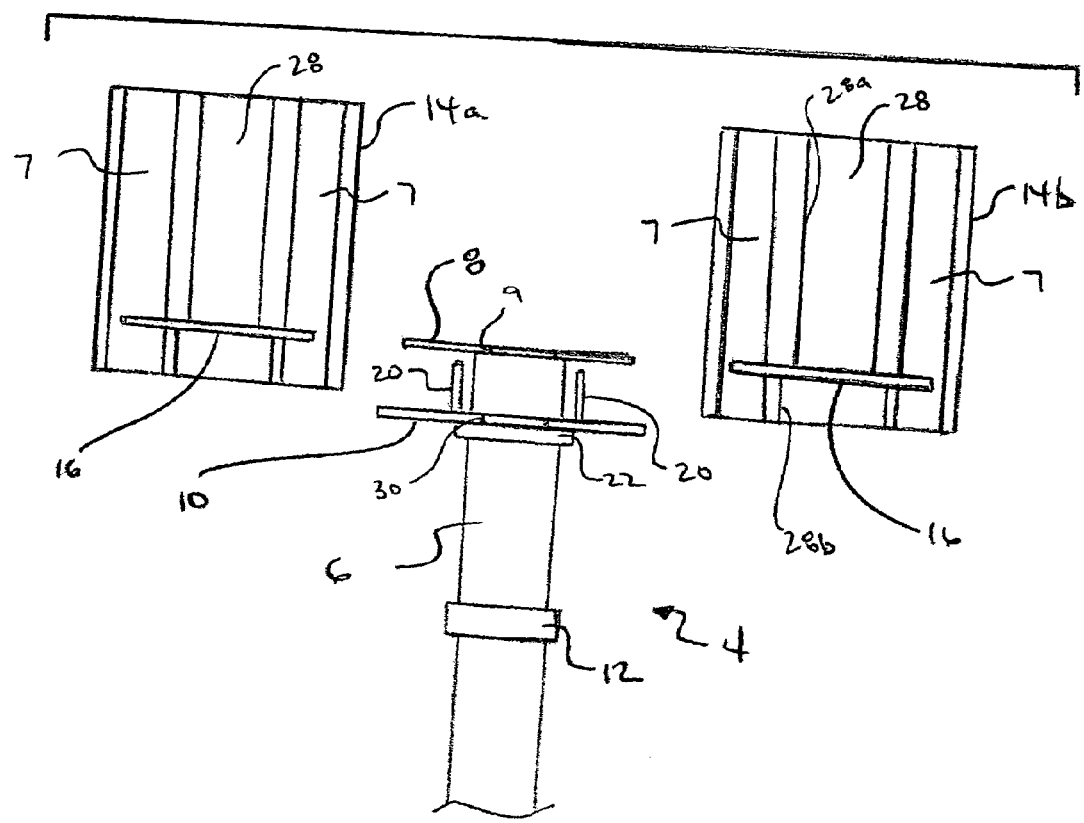
FIG. 2 is an exploded elevation view of the poke-through fitting of FIG. 1 with the intumescent member halves rotated 90°.
Figure 3:
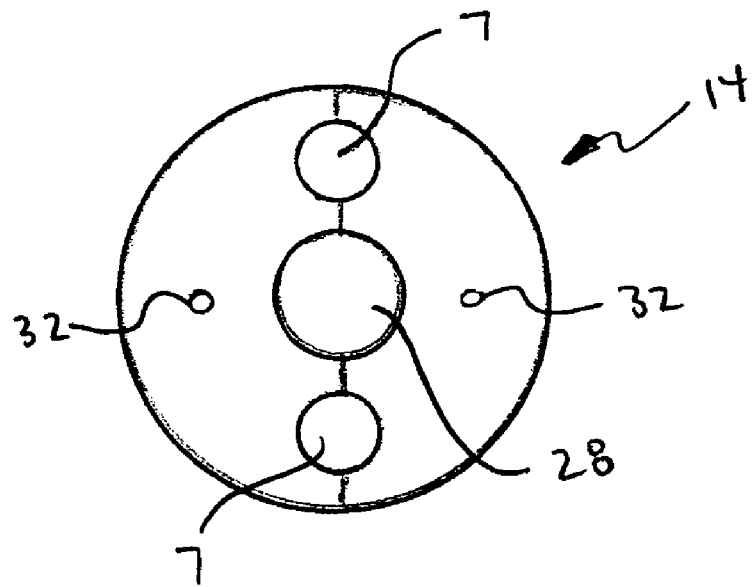
FIG. 3 is a top plan view of the intumescent member of the poke-through fitting of FIG. 1.

As shown in the drawings, and more particularly FIGS. 1 and 2, the present invention is directed to a fire retardant poke-through fitting 2 comprising a conduit body 4 and an intumescent member 14. The conduit body 4 comprises a conduit 6, a fixed flange 8 and a slidable flange 10. The intumescent member 14 is formed at least in part of an intumescent material and comprises a retention member for receiving the fixed flange 8 of the conduit body 4. A relationship between the slidable flange 10 and the intumescent member 14 is maintained by an engagement member which preferably comprises cooperating members on the intumescent member 14 and the slidable flange 10.

The conduit 6 forming a part of the conduit body 4 can be made of any suitable material and size, depending on the application, for the purpose of providing a passage for electrical, communication or other wiring or the like between floors or walls. For the general purposes of the present invention, it has been found that a ¾ inch EMT steel tube is suitable for use as the conduit 6, however, various high temperature materials and sizes may be appropriate for different applications, as would be appreciated by one skilled in the art.

Moreover, the length of the conduit 6 is generally dependent on the thickness of the floor or wall on which the fitting 2 is to provide a poke through. For example, when the fitting 2 is adapted to fit between the upper and lower surface of a four hour rated floor, extending downwardly below the bottom surface of the floor by a marginal amount to engage a junction box at the lower end of the conduit 6, the preferred length of the conduit 6 is from about 4" to about 6" inches.

Additionally, as is known in the art, the preferred fitting 2 is provided with one or more additional apertures 7, maintained independent from the conduit 6. The additional apertures provide distinct passages for electrical and communications wiring to be separated, as generally required.

Figure 5:
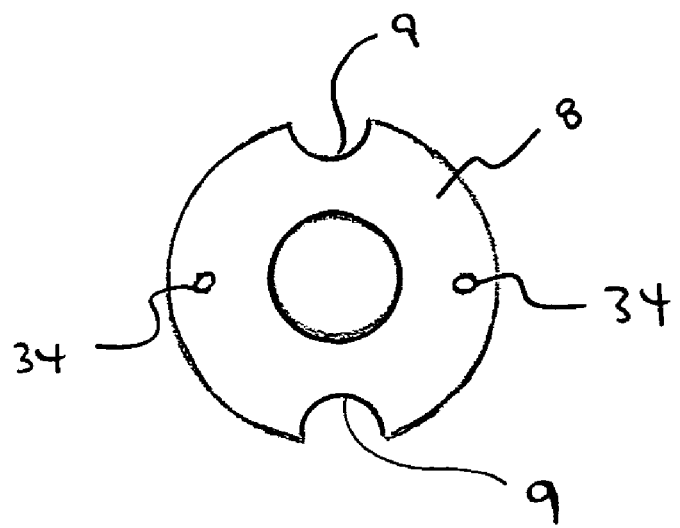
FIG. 5 is a top plan view of the fixed flange of the poke-through fitting of FIG. 1.
Figure 4:
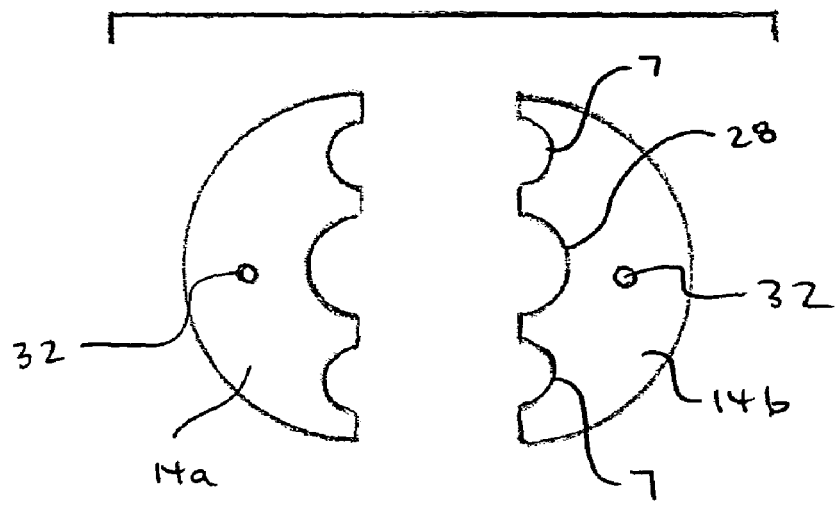
FIG. 4 is an exploded top plan view of the intumescent member of the poke-through fitting of FIG. 3.

In the preferred embodiment, the fixed flange 8 is permanently attached to, or formed integral with, the conduit 6 to ensure a fixed relation between the conduit 6 and the fixed flange 8. Although other structures can be used as the fixed flange 8, including things such as detents, posts, ears, etc., a plate as shown in FIG. 5 is most preferred since it acts to limit the downward expansion of the intumescent material during a high temperature condition. Thus, the intumescent material above the fixed flange 8 is primarily expanded above the fixed plate 8 in the hole through the floor or wall and around the wires passing through the fitting 2.

Furthermore, the fixed flange 8 is preferably a round plate having a diameter as close to the diameter of the hole between floors or walls as possible, while permitting the intumescent material to be maintained as a one piece member above and below the fixed flange 8. For example, when used in a 3 inch hole the preferred fixed flange 8 has a diameter of about 2⁷⁄₁₆ inches.

Notwithstanding, the fixed flange 8, as best shown in FIG. 5, includes one or more cutouts 9 for alignment with the one or more apertures 7, to permit use of the apertures 7 as passages between the floors or walls when additional lines need to be separated from electrical lines passing through the conduit 6.

The slidable flange 10 is most preferably formed of a steel plate 24 having a center opening 26 therein for receiving the conduit 6 and a steel collar 22 integral with or attached to the plate 24 about the center opening 26. For example, when a steel conduit 6 is used, the collar 22 can be formed as one piece with the plate 24 or welded to the plate 24.

The collar 22 is preferably formed about the center opening 26 of the plate 24 so that the slidable flange 10 may travel substantially freely or with limited friction between the slidable flange 10 and the conduit 6, at most to create an engagement element described below, but at most with only a slight tolerance to prevent twisting of the slidable flange 10 on the conduit.

In the preferred embodiment the plate 24 of the slidable flange 10 is formed in a circular configuration corresponding to the diameter of the hole through the floor or wall for receiving the fitting 2. As such, the slidable flange provides for controlled expansion of the intumescent material until the pressure releases upon reaching the edge of the floor or wall. In the example of a 3 inch hole through the floor, it has been found that the slidable flange may have a diameter of about 2¹⁵⁄₁₆ inches.

In a preferred embodiment, using a ¾ inch EMT, the center opening 26 of the plate 24 of the slidable flange 10 is about 1 inch to fit about the outer wall of the EMT with a limited tolerance. The collar 22 is formed of substantially the same interior diameter as the opening 26 in the plate 24 and can be any height suitable to prevent binding of the slidable flange 10 during sliding movement on the conduit 6, especially during expansion of the intumescent material in high temperature conditions. It has been found that a collar 22 having a height of about ¼ to about ½ inch is appropriate when a 1 inch opening 26 is used with a ¾ inch EMT.

Figure 6:
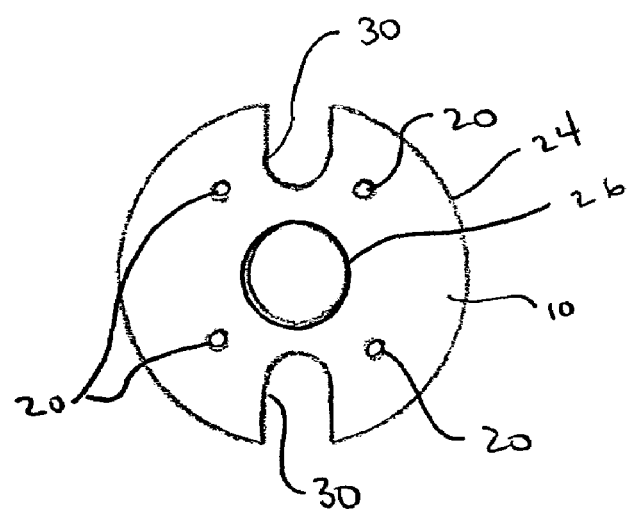
FIG. 6 is a top plan view of the slidable flange of the poke-through fitting of FIG. 1.

As shown in FIG. 6, the slidable flange 10 also includes one or more cutouts 30, in alignment with the one or more apertures 7 and cutouts 9 on the fixed flange 8, to provide additional passages through the fitting 2 when lines need to be separated form those passing through the conduit 6.

In the preferred embodiment shown in the figures, the slidable flange 10 preferably includes a cooperating member for engaging a cooperating member on the intumescent member 14, to maintain a relationship therebetween when the intumescent material expands. It is understood, however, that any engagement means, member, structure or device can be used to maintain the relationship between the slidable flange 10 and the intumescent member 14, on either the slidable flange 10, the intumescent member 14, the conduit 6 or combinations thereof. Such means may include adhesives, threads, snaps, wires, catches, fasteners, screws, nails, tacks, rivets, staples, springs, friction detents, friction fittings and the like. However, it has been found that cooperating members between the slidable flange 10 and the intumescent member 14 are suitable for the present invention.

In this regard, the preferred embodiment of the present invention as shown and described herein employs the use of detents 20 on the slidable flange 10 which are inserted into cooperating receptacles 18 on the intumescent member 14, as best seen in FIGS. 1, 2, 6, and 7.

In the preferred embodiment of the present invention a stop member 12 is used to limit the travel of the slidable flange 10 on the conduit 6. Although any suitable means for limiting the travel of the slidable flange 10 may be used, the most preferred stop member 12 is a steel ring which circles the conduit 6 and is permanently attached to the outer wall of the conduit 6 is preferred.

Of course, the stop member 12 can be any suitable structure that limits travel of the slidable flange 10, including any raised area on the outer wall of the conduit or additional structure fixed with relation to the conduit 6. For example, items such as detents, flanges, collars, posts, extensions, wires, chains and the like which act to limit travel of the slidable flange 10 would be suitable.

In the most preferred embodiment shown in the figures, the stop member 12 is affixed to the conduit 6 after the slidable flange 10 is placed on the conduit 6 below the fixed flange 8. Thus, the stop member 12 of the conduit body 4 provides a fixed limit for the travel of the slidable flange during expansion of the intumescent member 14.

In the preferred embodiment, the stop member 12 is set at a location corresponding to the position of the plate 24 of the slidable flange 10 at the bottom edge of a 4 hour fire rated floor. This location permits use of the fitting 2 of the present invention universally with 2, 3 and 4 hour fire rated floors or walls.

More particularly, the slidable flange 10 does not necessarily reach the stop member 12 when used with a 2 or 3 hour fire rated floor or wall. In such uses, the slidable flange 10 may slide down the conduit 6 until the pressure from the expanding intumescent material is relieved by emerging beneath the bottom edge of the floor. When used with a 4 hour floor, the expanding intumescent material can expand until the slidable collar 10 reaches the stop member 12, at which time expansion of the intumescent material is limited.

In the preferred embodiment of the present invention, the intumescent member is 14 comprises one or more intumescent materials adapted to surround at least a portion of the conduit body 6. Most preferred is the use of an intumescent member 14 formed entirely of the one or more intumescent materials, as shown in the attached drawings, simplifying manufacture of the present invention.

The intumescent material(s) suitable for use in the manufacture of the intumescent member 14 are well known in the art and need not be specified herein. When exposed to heat and flame, the intumescent material(s) absorb or react to heat and begin to expand at relatively low temperatures. The resultant flexible foam seals openings, forming a hard char which acts as an insulating barrier, to retard the spread of flames and smoke and control temperature increases.

In the preferred embodiment shown in FIGS. 2, 3, 4 and 7, the intumescent member 14 is preferably formed of at least two portions, 14a and 14b, which combine to encircle at least a portion of the conduit body 4. Alternatively, the intumescent member 14 can be formed of more than 2 portions, or even formed of a single piece molded about a portion of the conduit body 4 and function in accordance with the present invention.

The intumescent member 14 includes a main aperture 28 which lines up with the conduit 6 to provide a passage for the wiring passing through the conduit 6 and additional apertures 7 which line up with cutouts 9 and 30 of the fixed flange 8 and slidable flange 10, respectively. These additional apertures 7 provide a passage for wires to be separated from the wires passing through the conduit 6. The additional apertures 7 can be of any size, with about $^{11}/_{16}$ inches in diameter suitable for use in a fitting 2 for use in a 3 inch hole through a floor or wall.

The intumescent material forms at least a portion of the apertures 28 and 7, without the conduit 6 or other restrictive structure in these areas. As such, the intumescent material can expand directly about the wires passing through the intumescent member 14 in high temperature conditions, sealing the hole through the floor or wall.

It is preferred that a retention member be used for retaining the intumescent member 14 on the conduit body 4. The retention member is preferably formed directly in the intumescent material, as shown in FIG. 2, wherein the retention member is a slot 16 on each of the interior walls of the intumescent portions 14a and 14b, being formed to accept the fixed flange 8 of the conduit body 4. Of course, other retention members can be used depending on the particulars of the intumescent member 14, such as adhesives, threads, snaps, wires, catches, fasteners, screws, nails, tacks, rivets, staples, friction detents, friction fittings and the like, as long as the intumescent member 14 is retained in relation to the conduit body 4.

The upper section 28a of the aperture 28 in the intumescent member 14, relating to the portion of the aperture 28 above the slot 16, is preferably sized to correspond with the interior dimension of the conduit 6. Similarly, the lower portion 28b of aperture 28, related to the portion of the aperture 28 below the slot 16, is preferably of a larger diameter to accept the outer dimension of the conduit 6 just below the fixed flange 8.

Figure 7:
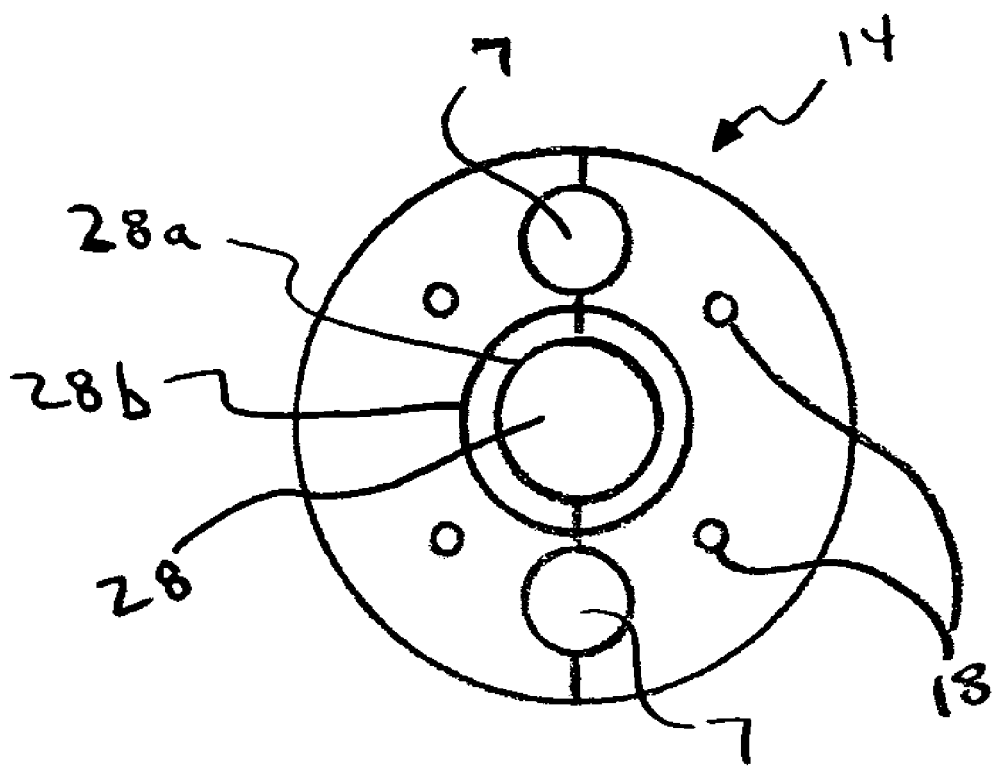
FIG. 7 is a bottom view of the intumescent member of the poke-through fitting of FIG. 1.

In the preferred embodiment shown, the intumescent member 14 also includes a series of receptacles 18 on the lower surface of the intumescent member 14, for receiving the detents 20 of the slidable flange 10. As best shown in FIGS. 6 and 7, the preferred cooperating engagement members include two receptacles 18 on each of the two portions 14a and 14b of the intumescent member 14 which receive the corresponding detents 20 on the slidable flange 10.

Of course, as set forth above, any suitable engagement member to maintain the relationship between the intumescent member 14 and the slidable flange 10 during expansion of the intumescent material can be used. Similarly, the detent 20 and receptacle 18 combination can be modified, such as to include only one receptacle 18 on each of the two portions 14a or 14b of the intumescent member 14 corresponding to two detents 20 on the slidable flange 10, etc.

The intumescent member 14 also preferably includes through holes 32 for passage of a screw or similar fastener from the top of the intumescent member 14 to the fixed flange 8. In this embodiment, the fixed flange 8 preferably includes receiver holes 34 that line up with the through holes 32 of the intumescent member 14 for receiving the fastener. It is contemplated that the receiver holes 34 would be threaded or self-tapping to receive a screw, or may alternatively comprise any cooperating means corresponding to the fastener chosen. These screws may be used to attach a receptacle typically used for wire connections.

During manufacture of the preferred embodiment of the fitting 2 shown in the drawing figures appended hereto, the slidable flange 10 is lowered to a position in the area of the stop member 12 and the two portions 14a and 14b of the intumescent member 14 are brought together around a portion of the conduit body 4. In bringing the intumescent portions 14a and 14b together, the fixed flange 8 is fitted within the slot 16 on the interior of the intumescent portions 14a and 14b with the conduit 6 projecting from the lower aperture section 28b.

The slidable flange 10 is then raised to the area of the intumescent member 14 so that the detents 20 are received by the receptacles 18 in the lower portion of the intumescent member 14, thereby setting the relationship between the intumescent member 14 and the slidable flange 10.

It will be understood by those skilled in the art that the fitting 2 of the present invention can be manufactured for use in any hole providing for the passage of wires or the like through a fire rated floor or wall. In this regard, although the specification describes a fitting for a 3 inch diameter hole, the invention works as well for 4 inch diameter holes or other sized or shaped holes through a fire rated floor or wall.

Of course, the particular dimensions of the elements will reflect the size and shape of the hole through the floor or wall, so that the size and shape of the intumescent member 14, fixed flange 8 and slidable flange 10 conform generally to the dimensions of the hole, as described above.

Variations, modifications and alterations to the preferred embodiment of the present invention described above will make themselves apparent to those skilled in the art. All such changes are intended to fall within the spirit and scope of the present invention, limited solely by the appended claims.

All patents referred to herein are hereby incorporated by reference.

I claim:

1. A fire retardant poke-through fitting comprising:
   a. a conduit body comprising:
      i. a conduit,
      ii. a fixed flange,
      iii. a slidable flange, and
   b. an intumescent member formed at least in part of an intumescent material, said intumescent member comprising an aperture corresponding to the conduit and a retention member for retaining the intumescent member on the conduit body wherein the slidable flange is maintained in relation to the intumescent member during expansion of the intumescent material by means of an engagement member coupling said slidable flange and said intumescent member and further wherein said slidable flange does not engage said conduit, so that the slidable flange travels along said conduit during expansion of said intumescent material.

2. The poke-through fitting of claim 1 wherein the fixed flange is located substantially at an upper terminal end of the conduit body.

3. The poke-through fitting of claim 1 wherein the intumescent member comprises at least two portions which encircle at least a portion of the conduit body including the fixed flange.

4. The poke-through fitting of claim 1 wherein the retention member is taken from the group consisting of adhesives, threads, snaps, wires, catches, fasteners, screws, nails, tacks, rivets, staples, friction detents and friction fittings.

5. The poke-through fitting of claim 1 wherein the retention member comprises a slot for receiving the fixed flange of the conduit body.

6. The poke through fitting of claim 1 wherein the engagement member is taken from the group consisting of adhesives, threads, snaps, wires, catches, fasteners, screws, nails, tacks, rivets, staples, springs, friction detents and friction fittings.

7. The poke-through fitting of claim 1 wherein the engagement member comprises cooperating members associated with the slidable flange and the intumescent member.

8. The poke-through fitting of claim 7 wherein the cooperating engagement members comprise one or more receptacles on the intumescent member which receive one or more cooperating detents on said slidable flange.

9. The poke-through fitting of claim 1 wherein the intumescent member comprises one or more additional apertures for passage therethrough.

10. The poke-through fitting of claim 1 wherein the intumescent member is formed entirely of one or more intumescent materials.

11. The poke-through fitting of claim 1 wherein the fixed flange is a plate having an opening in alignment with the conduit.

12. The poke-through fitting of claim 11 wherein the fixed flange is permanently affixed to the conduit.

13. The poke-through fitting of claim 1 wherein the slidable flange comprises an opening corresponding to an exterior dimension of the conduit to allow the slidable flange to slide on the conduit.

14. The poke through fitting of claim 1 wherein the conduit body further comprises a stop member.

15. The poke-through fitting of claim 14 wherein the stop member is taken from the group consisting of a raised area on the conduit and detents, flanges, collars, posts and extensions permanently attached to the conduit.

16. The poke-through fitting of claim 14 wherein the stop member is permanently attached to the conduit in a location corresponding to the thickness of a four hour rated fire floor.

17. The poke-through fitting of claim 1 wherein the conduit and the fixed flange are maintained in a permanently affixed or integral arrangement.

* * * * *